(12) United States Patent
Suzuki et al.

(10) Patent No.: US 9,412,494 B2
(45) Date of Patent: Aug. 9, 2016

(54) ELECTRICAL-WIRE-PROTECTING MEMBER

(71) Applicant: YAZAKI CORPORATION, Tokyo (JP)

(72) Inventors: Kenji Suzuki, Shizuoka (JP); Kenji Kajikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/401,765

(22) PCT Filed: Jul. 24, 2013

(86) PCT No.: PCT/JP2013/070068
§ 371 (c)(1),
(2) Date: Nov. 17, 2014

(87) PCT Pub. No.: WO2014/017546
PCT Pub. Date: Jan. 30, 2014

(65) Prior Publication Data
US 2015/0179301 A1    Jun. 25, 2015

(30) Foreign Application Priority Data

Jul. 25, 2012 (JP) ................ 2012-165183

(51) Int. Cl.
| | | |
|---|---|---|
| *H01B 7/17* | (2006.01) | |
| *H01R 13/56* | (2006.01) | |
| *H02G 3/04* | (2006.01) | |
| *H01R 13/58* | (2006.01) | |
| *H02G 3/08* | (2006.01) | |

(52) U.S. Cl.
CPC ............... *H01B 7/17* (2013.01); *H01R 13/56* (2013.01); *H01R 13/5825* (2013.01); *H02G 3/0468* (2013.01); *H01R 13/567* (2013.01); *H02G 3/088* (2013.01)

(58) Field of Classification Search
USPC ........................................... 174/68.3
See application file for complete search history.

(56) References Cited

U.S. PATENT DOCUMENTS

| | | | |
|---|---|---|---|
| 7,915,542 B2 * | 3/2011 | Forbis | ............... H02G 3/32 174/101 |
| 2002/0170736 A1 | 11/2002 | Yamashita et al. | |
| 2008/0303272 A1 | 12/2008 | Takahashi et al. | |

FOREIGN PATENT DOCUMENTS

| | | |
|---|---|---|
| JP | 2002-343497 A | 11/2002 |
| JP | 2004-23897 A | 1/2004 |
| JP | 2008-305612 A | 12/2008 |
| JP | 2010-55863 A | 3/2010 |

OTHER PUBLICATIONS

English language of the Written Opinion of the International Search Report for PCT/JP2013/070068 dated Sep. 17, 2013.
International Search Report and Written Opinion of the International Search Report for PCT/JP2013/070068 dated Sep. 17, 2013.
Chinese Office Action for the related Chinese Patent Application No. 201380039691.X dated May 23, 2016.

* cited by examiner

*Primary Examiner* — Dhirubhai R Patel
(74) *Attorney, Agent, or Firm* — Kenealy Vaidya LLP (57) ABSTRACT

A electrical wire cover has a corrugated tube fixing portion (29) and engagement projection strips (49) which are integral parts of a cover body (27) which surrounds electrical wires, a electrical wire tie which fixes, that is, tightly fastens, one of first to third corrugated tubes, and tying member restricting portions (53) provided in the corrugated tube fixing portion (29). Each tying member restricting portion (53) has plural, that is, first to third, positioning portions (55, 57, and 59) having different electrical wire tie bridging positions.

6 Claims, 11 Drawing Sheets

ELECTRICAL-WIRE-PROTECTING MEMBER

TECHNICAL FIELD

The present invention relates to an electrical wire protection member.

BACKGROUND ART

Among known connectors that are equipped with a cover for fixing a corrugated tube to a connector housing are ones that allow corrugated tubes having different outer diameters to be fixed properly (refer to Patent document 1, for example).

Figure 7A:
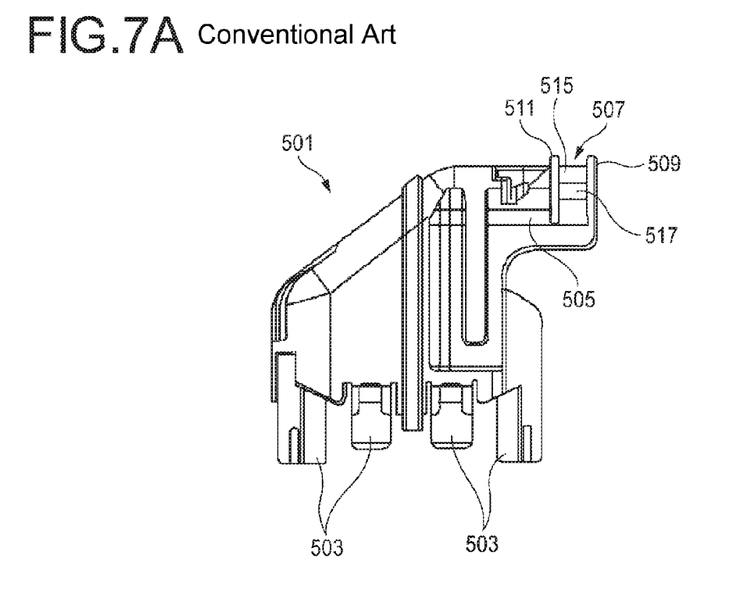
FIG. 7A is a side view of a conventional electrical wire protection member.
Figure 7B:
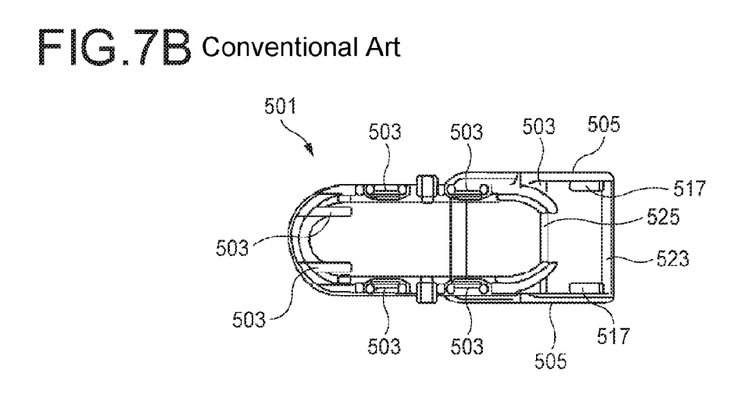
FIG. 7B is a bottom view of the electrical wire protection member shown in FIG. 7A.

Connectors of this kind are configured in such a manner that a connector housing and a connector cover (electrical wire protection member) which are separate members can be detached from each other. As shown in FIGS. 7A and 7B, a connector cover 501 is provided with a fitting part 503 and a tube insertion portion 505. The fitting part 503 is locked on a lock part (not shown) of the connector housing and thereby fitted in or with the connector housing. The tube insertion portion 505 is provided with a cable tie restricting portion 507 which determines a tying position of a cable tie (tying member) 513 by means of a first restriction wall 509 and a second restriction wall 511 (see FIGS. 8A and 8B).

Two cable tie insertion holes 517 are formed through a cable tie contact portion 515 of the cable tie restricting portion 507 to allow a cable tie 513 to be inserted from the outside to the inside. Even where a first corrugated tube 519 and a second corrugated tube 521 having different valley or peak pitches are to be connected to the connector, the connector cover 501 allows each corrugated tube to be engaged with both of a first lock projection 523 and a second lock projection 525 because the distance between the first lock projection 523 and the second lock projection 525 is set at a common multiple of the respective pitches.

Figure 8A:
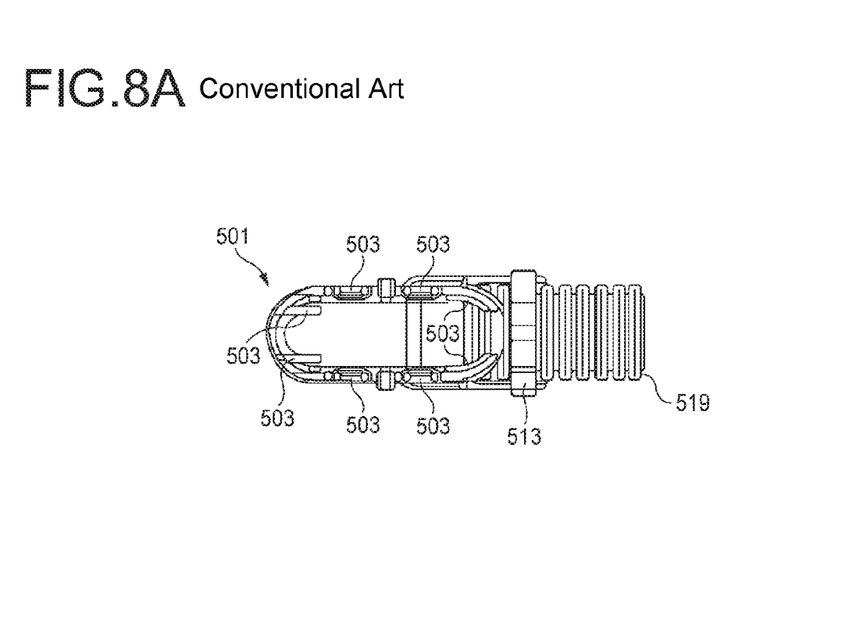
FIG. 8A is a bottom view of the conventional electrical wire protection member to which a first corrugated tube is fixed.
Figure 8B:
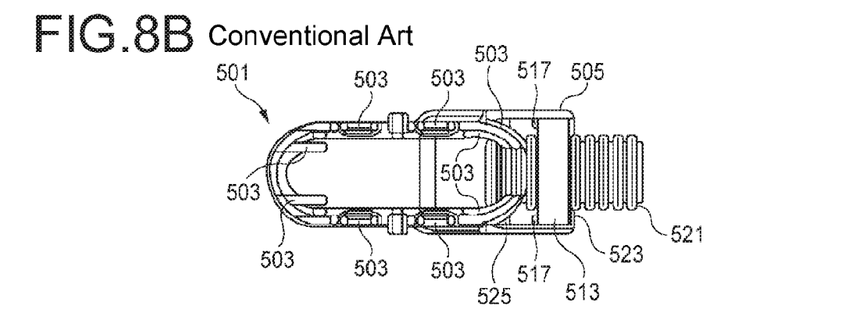
FIG. 8B is a bottom view of the conventional electrical wire protection member to which a second corrugated tube is fixed.

The outer diameter of the larger-size first corrugated tube 519 approximately coincides with the inner diameter of a right-hand opening of the tube insertion portion 505. In a side view, it is seen that a lower portion of the first corrugated tube 519 is exposed to a large extent from the bottom portion of the tube insertion portion 505. Therefore, as shown in FIG. 8A, the first corrugated tube 519 can be fixed properly even if it is fixed by a cable tie 513 that is wound around the outer circumference (approximately a half circle) of the tube insertion portion 505.

On the other hand, when the second corrugated tube 521 is to be attached, because of its small diameter, it is seen in a side view that almost no part of it is exposed from the bottom portion of the tube insertion portion 505. Therefore, it the second corrugated tube 521 is fixed in such a manner that a cable tie 513 is wound around the entire outer circumference of the tube insertion portion 505 in the same manner as in the case of the first corrugated tube 519, the cable tie 513 and the second corrugated tube 521 have only a short contact portion; the second corrugated tube 521 may not be fixed properly. If no part of the second corrugated tube 521 is exposed from the bottom portion of the tube insertion portion 505, it cannot be fixed using a cable tie 513. In view of this, as show in FIG. 8B, a cable tie 513 is inserted through the cable tie insertion holes 517 at the halfway positions so as to run inside instead of being wound around the entire outer circumference of the tube insertion portion 505, whereby the cable tie 513 and the second corrugated tube 521 are given a sufficiently long contact portion. With this measure, the second corrugated tube 521 can be fixed to the tube insertion portion 505 properly.

PRIOR ART DOCUMENTS

Patent Documents

Patent document 1: JP-A-2008-305612

SUMMARY OF THE INVENTION

Problems to be Solved by the Invention

However, in the above-described connector cover 501, when the larger-outer-diameter first corrugated tube 519 is attached to it, a cable tie 513 is not inserted through the cable tie insertion holes 517. The cable tie 513 that fixes the first corrugated tube 519 is held only by the cable tie restricting portion 507 and the cable tie contact portion 515. That is, since no structure for holding the cable tie 513 exists on the opening side of the tube insertion portion 505, the cable tie 513 may be disengaged from the cable tie restricting portion 507 due to vibration.

Furthermore, where a corrugated tube that is larger in outer diameter than the two kinds of, that is, first and second, corrugated tubes 519 and 521 is to be used, it is difficult to hold it using a cable tie 513.

The present invention has been made in view of the above circumstances, and an object of the present invention is therefore to provide a good cable protection member which enables use of plural kinds of corrugated tubes having different outer diameters and prevents a tying member from being disengaged from a tying member restricting portion(s).

Means for Solving the Problems

The above object of the invention is attained by the following configurations:

(1) A electrical wire protection member comprising a body which surrounds an electrical wire to be installed; a semicylindrical corrugated tube fixing portion which is an integral part of the body and to which an end portion of one of plural kinds of corrugated tubes having different diameters is fixed, wherein the electrical wire is inserted in the corrugated tube; engagement projection strips which project inward from the corrugated tube fixing portion so as to extend in a radial direction of the corrugated tube fixing portion, and which engage with respective outer circumferential grooves of the corrugated tube; a tying member which fixes, by tight fastening, the corrugated tube to an inner peripheral surface of the corrugated tube fixing portion; and tying member restricting portions which are formed in respective end portions of the corrugated tube fixing portion in an outer circumferential direction of the corrugated tube fixing portion and which determine a position of the tying member, wherein each of the tying member restricting portions has plural positioning hole portions having different tying member bridging positions that correspond to the different diameters of the corrugated tubes, respectively.

In the electrical wire protection member having the configuration of item (1), the corrugated tube whose end portion is placed in the corrugated tube fixing portion is fixed to the corrugated tube fixing portion by a tying member. At this time, the position of the tying member is determined by the tying member restricting portions which are formed in the respective end portions of the corrugated tube fixing portion in the outer circumferential direction of the corrugated tube fixing portion. Each tying member restricting portion is provided with the plural positioning hole portions having the different tying member bridging positions that correspond to the different outer diameters of the corrugated tubes, respectively. That is, whichever of the corrugated tubes having the respective outer diameters is fixed, a tying member is inserted through the one, having the corresponding tying member bridging position, of the positioning hole portions and is thereby prevented reliably from coming off. As such, since each tying member restricting portion is provided with the plural positioning hole portions having the different tying member bridging positions, the corrugated tube fixing portion can satisfactorily fix, that is, tightly fasten, the corrugated tubes having the plural respective outer diameters without causing events that tying members crush them.

(2) The electrical wire protection member according to the configuration of item (1), wherein the positioning hole portions corresponding to a corrugated tube having a maximum diameter are located outside respective positioning hole portions corresponding to a corrugated tube having another diameter, and have respective elongated bridging walls which extend in a tangential direction of the corrugated tube.

In the electrical wire protection member having the configuration of item (2), the positioning hole portion corresponding to the corrugated tube having the maximum diameter is provided outside the positioning hole portion corresponding to the corrugated tube having another diameter. As a result, the total length of the tying member restricting portions in the corrugate tube axial direction can be made smaller than in a case that positioning hole portions are arranged in the direction that is parallel with the axial direction.

In each of the positioning hole portions corresponding to the corrugated tube having the maximum diameter, the tip of the elongated bridging wall defines the tying member bridging position. A tying member that is inserted in these positioning holes is stretched between the tips of the elongated bridging walls located on the two respective sides and fixes, that is, tightly fastens, the corrugated tube having the maximum diameter by pressing its top portion that projects relative to the semicylindrical corrugated tube fixing portion. In this state, in each of the positioning hole portions corresponding to the corrugated tube having the maximum diameter, the tying member bridging position is located outside the positioning hole in the tangential direction by the elongation length of the elongated bridging wall. Therefore, the corrugated tube having the maximum diameter to be fixed, that is, to be fastened tightly, can be prevented from being crushed irrespective of the positions of the positioning holes.

(3) The electrical wire protection member according to the configuration of item (2), wherein positioning projections which position the tying member project from tips of the elongated bridging walls, respectively.

In the electrical wire protection member having the configuration of item (3), a tying member that is inserted in and guided out of the positioning holes of the positioning hole portions corresponding to the corrugated tube having the maximum diameter is hooked on the tips of the elongated bridging walls and thereby fixes, that is, tightly fastens, the corrugated tube having the maximum diameter. When the corrugated tube having the maximum diameter receives force of moving it in its axial line due to vibration or the like, the tying member is urged to move in the same direction. However, the respective positioning projections which project from the tips of the elongated bridging walls restrict the movement of the tying member. Thus, the tying member is prevented reliably from coming off passing the tips of the elongated bridging walls.

The invention has been described above concisely. The details of the invention will become more apparent by reading the following modes for carrying out the invention (referred to below as an embodiment) while referring to the accompanying drawings.

BRIEF DESCRIPTION OF THE DRAWINGS

A part (a) of FIG. 3 is a front view and a side view of a first corrugated tube, a part (b) of FIG. 3 is a front view and a side view of a second corrugated tube, and a part (c) of FIG. 3 is a front view and a side view of a third corrugated tube.

MODES FOR CARRYING OUT THE INVENTION

An embodiment of the present invention will be hereinafter described with reference to the drawings.

An electrical wire protection member according to the embodiment of the invention is used as an electrical wire cover, a harness protector, or the like. The embodiment is directed to an example electrical wire protection member that is an electrical wire cover 11. The electrical wire cover 11 can be applied to, for example, a low insertion force connector 15 (see FIGS. 2A and 2B) which is a connector having a lever 13 for lowering the force that is necessary for insertion into a mating connector (not shown).

Figure 2A:
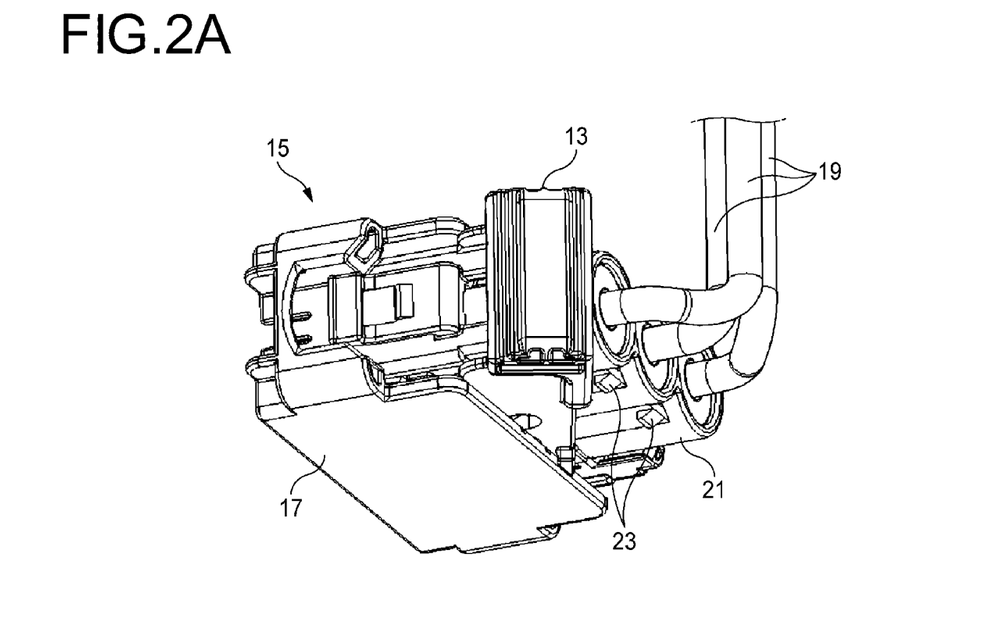
FIG. 2A is a perspective view, as viewed from the electrical wire guide-out side, of a connector to which the electrical wire cover shown in FIG. 1A is to be attached.
Figure 2B:
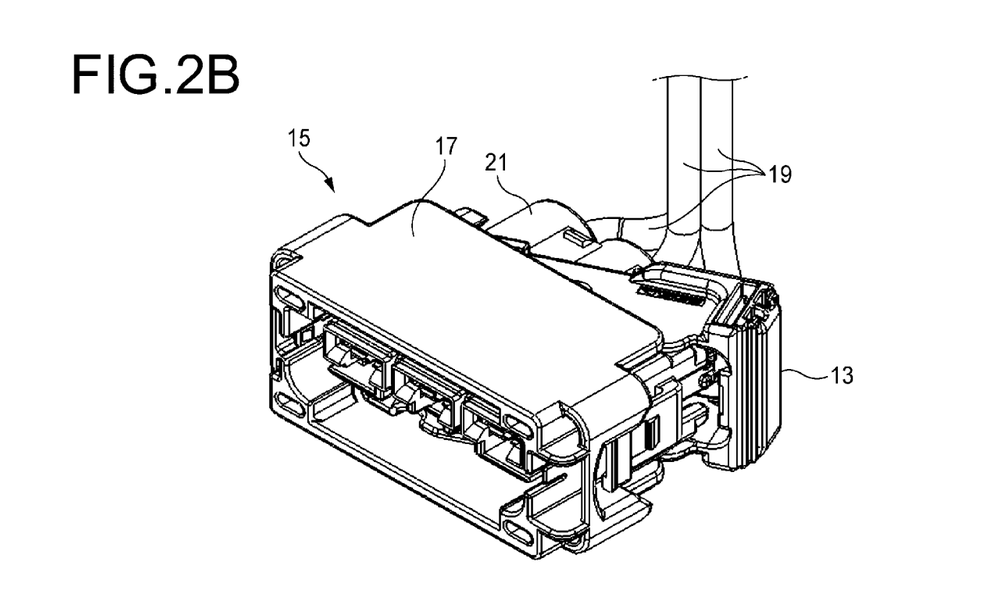
FIG. 2B is a perspective view, as viewed from the side of connection to a mating connector, of the connector shown in FIG. 2A.

As shown in FIGS. 2A and 2B, in the low insertion force connector 15, plural terminals (not shown) are housed in a connector housing 17. An electrical wire 19 is connected to each terminal and guided out from a housing rear portion 21 which is located on the opposite side to the side of fitting into or with the mating connector. The housing rear portion 21 of the connector housing 17 is formed with cover lock projections 23 for locking of the electrical wire cover 11. In the embodiment, the plural electrical wires 19 guided out from the housing rear portion 21 are covered with the electrical wire cover 11 in such a state as to be bent to the direction that is perpendicular to the connector fitting direction (left-right direction in FIG. 2A). That is, the electrical wire cover 11 forms an electrical wire housing path that is bent so as to assume an L shape.

Figure 1A:
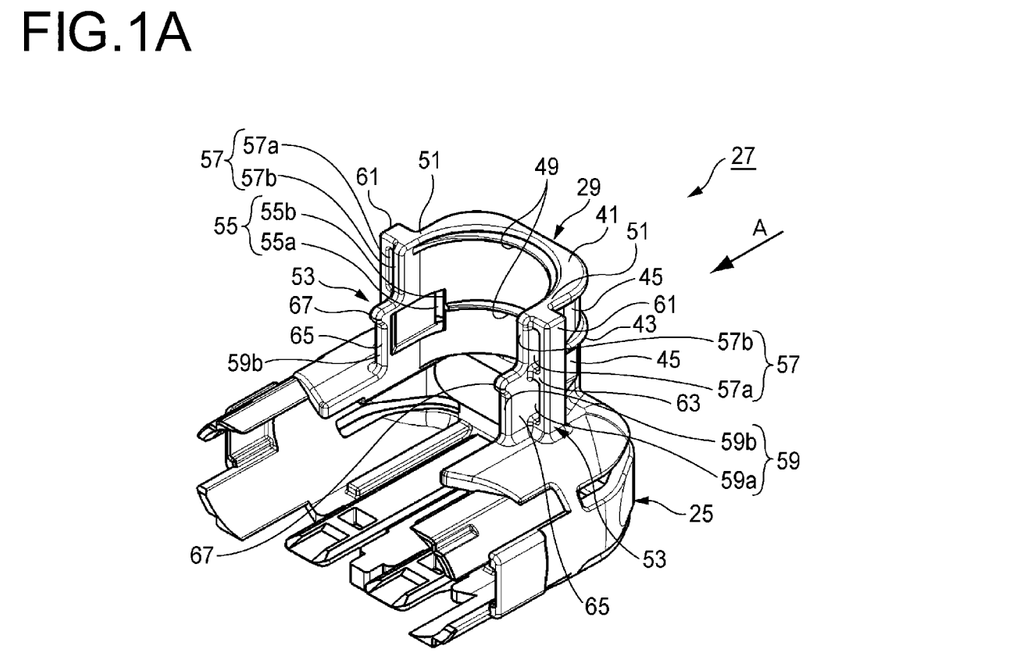
FIG. 1A is a perspective view of an electrical wire cover according to an embodiment of the present invention.
Figure 1B:
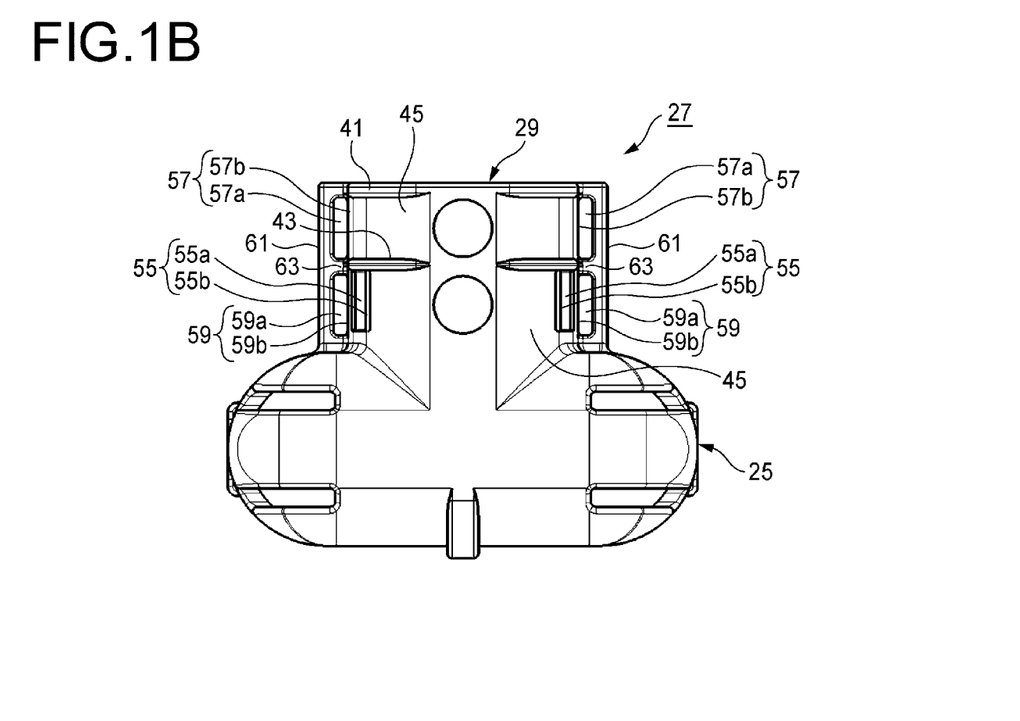
FIG. 1B is a view, as viewed from the direction of arrow A, of the electrical wire cover shown in FIG. 1A.

As shown in FIGS. 1A and 1B, a cover body (body) 27 of the electrical wire cover 11 has a electrical wire housing portion 25 for housing guided-out portions (i.e., portions immediately adjacent to the housing rear portion 21) of the electrical wires 19 and a corrugated tube fixing portion 29 for covering portions, bent in the direction perpendicular to the electrical wire housing portion 25, of the electrical wires 19. The corrugated tube fixing portion 29 is continuous with the electrical wire housing portion 25. That is, the cover body 27 has the semicylindrical corrugated tube fixing portion 29 as an integral part. And an end portion of each of plural kinds of, that is, first to third, corrugated tubes 35, 37, and 39 having different diameters in which the electrical wires 19 are inserted can be fixed to the corrugated tube fixing portion 29.

Figure 3:
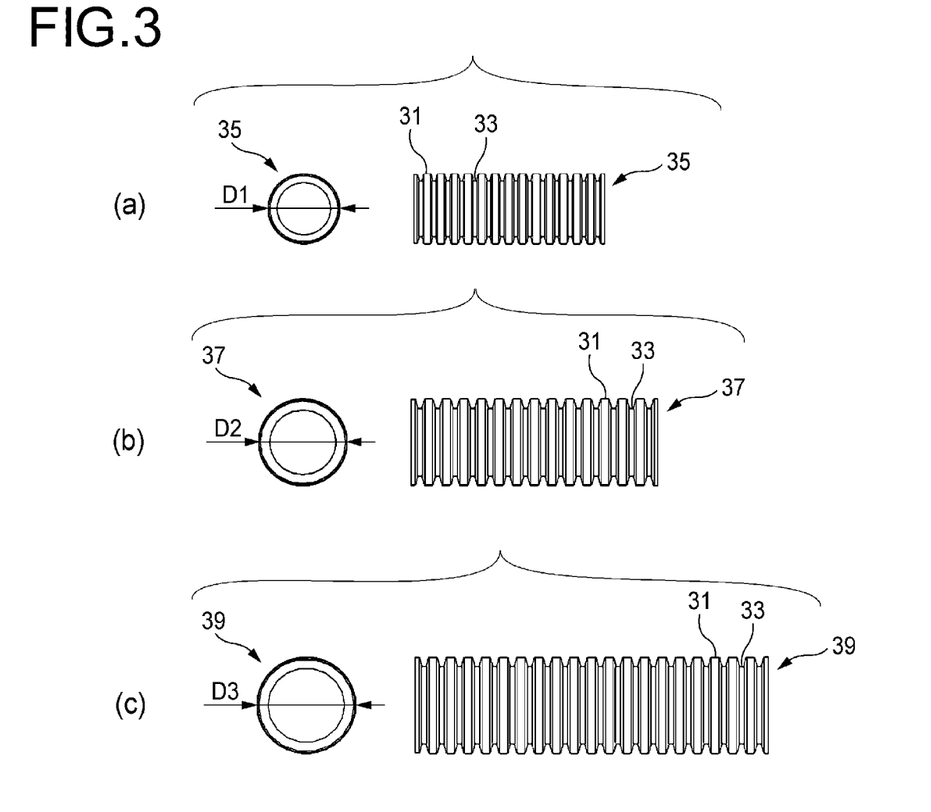

The plural electrical wires 19 placed inside the corrugated tube fixing portion 29 are inserted together in a corrugated tube. That is, the plural electrical wires 19 are protected by one of the first to third corrugated tubes 35, 37, and 39. Made of a synthetic resin, each of the first to third corrugated tubes 35, 37, and 39 is formed so as to assume a bellows shape in which its outer circumferential surface is formed with circumferential projection strips 31 and outer circumferential grooves 33 which are arranged alternately (see parts (a)-(c) of FIG. 3) and to be flexible so as to be able to undergo flexural deformation while being curved. Since the guided-out portions (adjacent to the housing rear portion 21) of the electrical wires 19 are surrounded by one of the first to third corrugated tubes 35, 37, and 39, these portions of the electrical wires 19 are protected without being exposed to the outside.

In the electrical wire cover 11 according to the embodiment, each of the first to third corrugated tubes 35, 37, and 39 having respective outer diameters D1, D2, and D3 can be fixed to the corrugated tube fixing portion 29. The outer diameters D1, D2, and D3 have a relationship D1<D2<D3. More specifically, the outer diameters D1, D2, and D3 may be set at 14.10 mm, 17.50 mm, and 19.50 mm, respectively.

A first restriction wall 41 and a second restriction wall 43 project like brims from the outer circumferential surface of the corrugated tube fixing portion 29. The portion, between the first restriction wall 41 and the second restriction wall 43, of the outer circumferential surface of the corrugated tube fixing portion 29 serves as a electrical wire tie contact portion 45. That is, the first restriction wall 41 and the second restriction wall 43 can restrict the tying position of a electrical wire tie 47 (tying member; see FIGS. 4A and 4B) with respect to the outer circumferential surface of the corrugated tube fixing portion 29. The electrical wire tie 47 that is restricted by the first restriction wall 41 or the second restriction wall 43 fixes, that is, fastens tightly, the corrugated tube to the inner peripheral surface of the corrugated tube fixing portion 29.

A pair of semicircular engagement projection strips 49 project from the inner peripheral surface of the corrugated tube fixing portion 29 so as to extend in the radial direction, are arranged parallel with each other, and are engaged with outer circumferential grooves 33 of the corrugated tube. As a result, one of the first to third corrugated tubes 35, 37, and 39 which is engaged with the semicircular engagement projection strips 49 are locked so as not to be movable in the axial direction.

Two outer circumferential end portions 51 of the semicylindrical corrugated tube fixing portion 29 are provided with respective tying member restricting portions 53 which determine a position of an electrical wire tie 47. Each of the tying member restricting portions 53 has plural (on the embodiment, three, that is, first to third) positioning hole portions 55, 57, and 59 having different electrical wire tie 47 bridging positions that correspond to the outer diameters D1, D2, and D3 of the first to third corrugated tubes 35, 37, and 39, respectively.

The first positioning hole portion 55 of the embodiment has a first positioning hole 55a in which a electrical wire tie 47 is to be inserted for the first corrugated tube 35 and an inside opening edge 55b which defines a electrical wire tie 47 bridging position. The first positioning hole 55a is bored through a wall portion of each of the two outer circumferential end portions 51 so as to extend parallel with the tangential direction of the first corrugated tube 35. And the inside opening edge 55b of the first positioning hole 55a defines a electrical wire tie 47 bridging position corresponding to the first corrugated tube 35.

The second positioning hole portion 57 of the embodiment has a second positioning hole 57a in which a electrical wire tie 47 is to be inserted for the second corrugated tube 37 and an inside opening edge 57b which defines a electrical wire tie 47 bridging position. The second positioning hole 57a is bored through a projected portion 61 that projects outward in the radial direction from each of the two outer circumferential end portions 51 so as to extend parallel with the tangential direction of the second corrugated tube 37. And the inside opening edge 57b of the second positioning hole 55a defines a electrical wire tie 47 bridging position corresponding to the second corrugated tube 37.

The third positioning hole portion 59 of the embodiment has a third positioning hole 59a in which a electrical wire tie 47 is to be inserted for the third corrugated tube 39 and a tip 59b of an elongated bridging wall 65 which defines a electrical wire tie 47 bridging position. The third positioning hole 59a is bored through the projected portion 61 which projects outward in the radial direction from each of the two outer circumferential end portions 51 so as to extend parallel with the tangential direction of the third corrugated tube 39. And the tip 59b of the elongated bridging wall 65 which extends parallel with the tangential direction of the third corrugated tube 39 from an inside opening edge of the third positioning hole 59a defines a electrical wire tie 47 bridging position corresponding to the third corrugated tube 39.

That is, the first to third positioning hole portions 55, 57, and 59 are formed so as to provide different electrical wire tie 47 bridging positions in such a manner that the electrical wire tie 47 bridging position advances in the tangential direction of the corrugated tube in order of the outer diameters of the first to third corrugated tubes 55, 57, and 59. With this measure, the corrugated tube fixing portion 29 can satisfactorily fix, that is, fasten tightly, the first to third corrugated tubes 35, 37, and 39 having the different outer diameters without causing events that electrical wire ties 47 crush them.

Each pair of a second positioning hole 57a and a third positioning hole 59a are bored through the projected portion 61 which project outward in the radial direction from the corresponding one of the two outer circumferential end portions 51 so as to be arranged side by side in the axial direction of the corrugated tube. That is, each pair of a second positioning hole 57a and a third positioning hole 59a are partitioned by a partition wall 63.

Each third positioning hole portion 59 which corresponds to the third corrugated tube 39 which is the corrugated tube having the maximum diameter is formed outside the associated first positioning hole portion 55 which corresponds to the first corrugated tube 35 which is the corrugated tube having another diameter. A positioning projection 67 for positioning a electrical wire tie 47 projects from the tip 59b of the elongated bridging wall 65 which extends from the inside opening edge of each third positioning hole 59a.

Next, a description will be made of how the above-configured electrical wire cover 11 works.

Figure 4A:
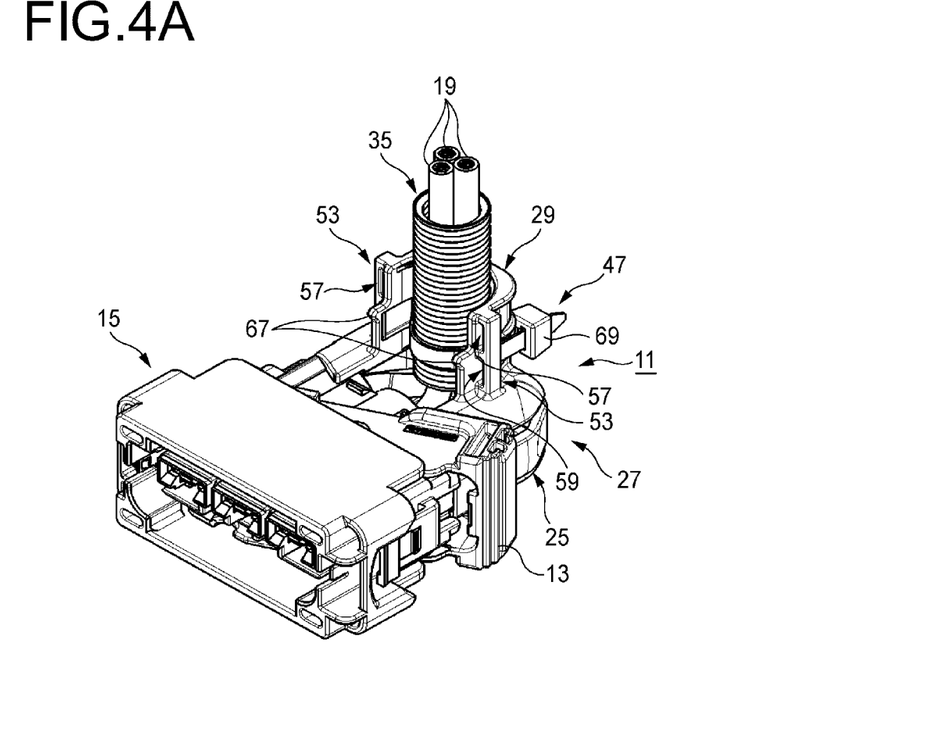
FIG. 4A is a perspective view of the electrical wire cover to which the first corrugated tube is attached.
Figure 4B:
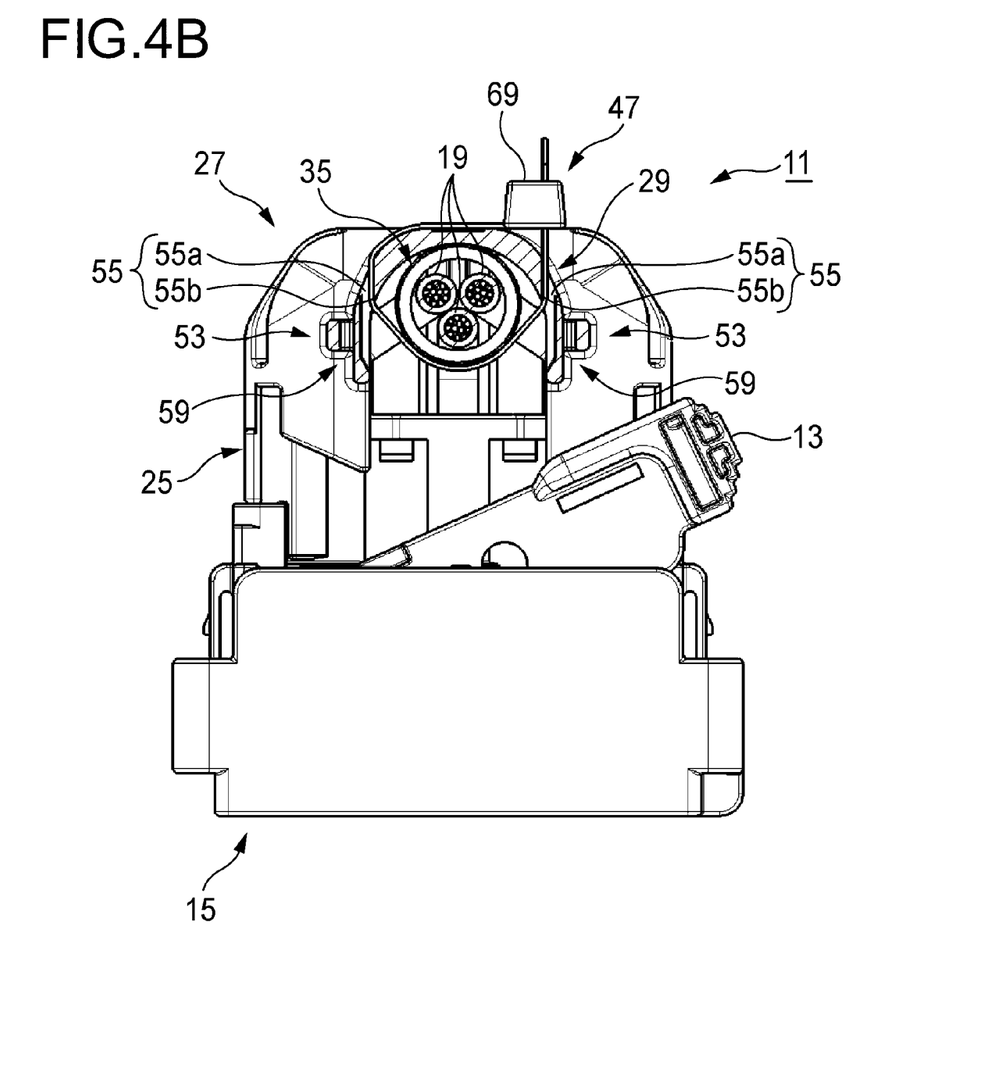
FIG. 4B is a front view, as viewed the electrical wire guide-out side, of the electrical wire cover shown in FIG. 4A.

To fix the first corrugated tube 35 to the electrical wire cover 11, as shown in FIGS. 4A and 4B, an end portion of the first corrugated tube 35 is placed in the corrugated tube fixing portion 29 in such a manner as to be engaged with the engagement projection strips 49 (see FIGS. 1A and 1B). The first corrugated tube 35 is fixed, that is, tightly fastened, to the corrugated tube fixing portion 29 by a electrical wire tie 47 that is inserted through the first positioning hole portions 55 of the tying member restricting portions 53 which are formed in the two outer circumferential end portions 51 of the corrugated tube fixing portion 29. More specifically, a band tip portion of a electrical wire tie 47 is inserted into the first positioning hole 55a of one first positioning hole portion 55, wound around an outer circumferential surface of the first corrugated tube 35, inserted into the first positioning hole 55a located on the opposite side, wound around the corresponding electrical wire tie contact portion 45 (see FIGS. 1A and 1B), and inserted into a buckle 69 of the electrical wire tie 47. Thus, the first corrugated tube 35 is fixed to the corrugated tube fixing portion 29.

Figure 5A:
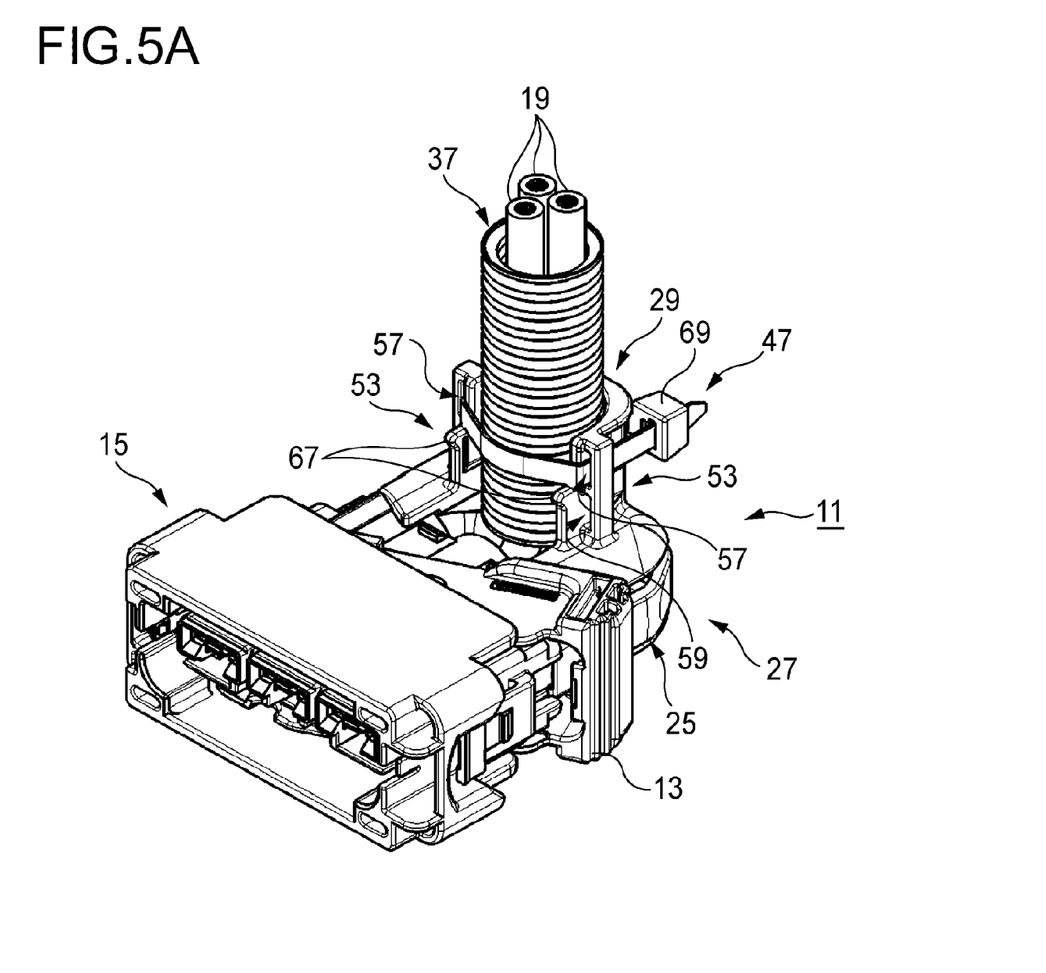
FIG. 5A is a perspective view of the electrical wire cover to which the second corrugated tube is attached.
Figure 5B:
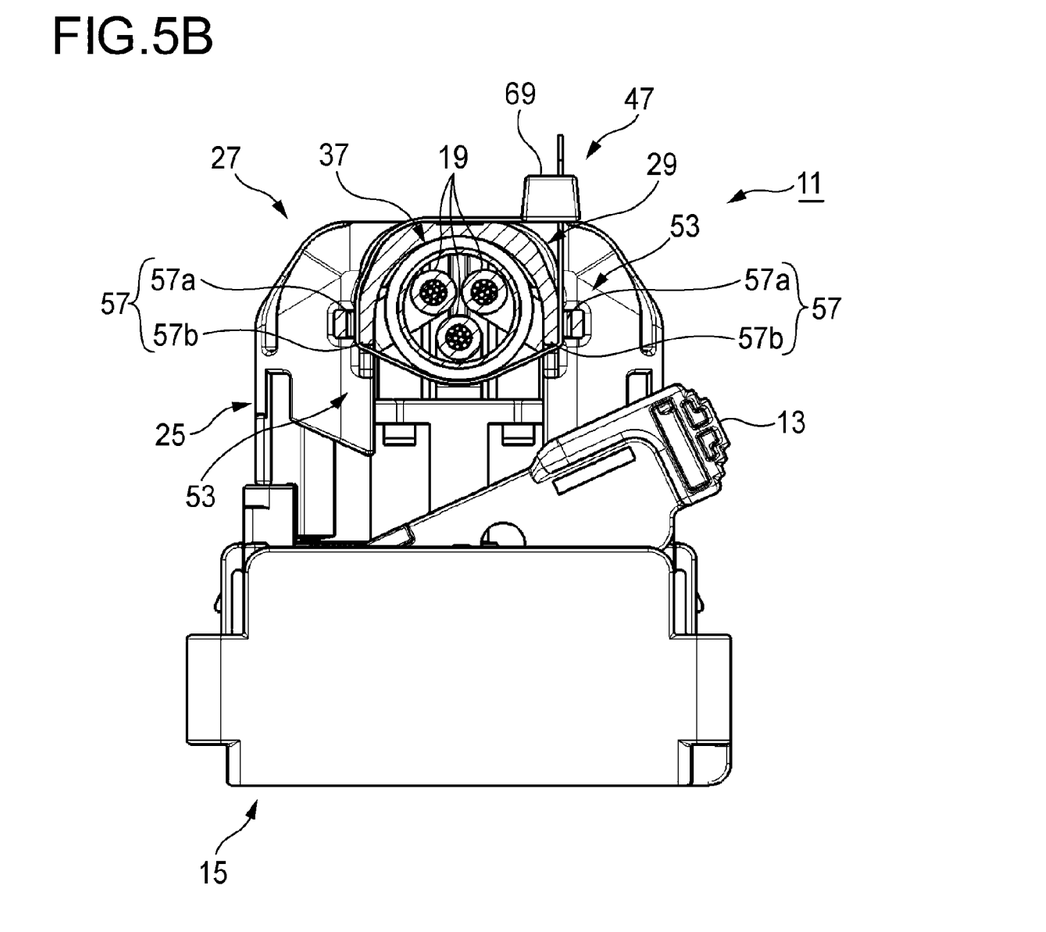
FIG. 5B is a front view, as viewed the electrical wire guide-out side, of the electrical wire cover shown in FIG. 5A.

To fix the second corrugated tube 37 to the electrical wire cover 11, as shown in FIGS. 5A and 5B, an end portion of the second corrugated tube 37 is placed in the corrugated tube fixing portion 29 in such a manner as to be engaged with the engagement projection strips 49 (see FIGS. 1A and 1B). The second corrugated tube 37 is fixed, that is, tightly fastened, to the corrugated tube fixing portion 29 by a electrical wire tie 47 that is inserted through the second positioning hole portions 57 of the tying member restricting portions 53. More specifically, a band tip portion of a electrical wire tie 47 is inserted into the second positioning hole 57a of one second positioning hole portion 57, wound around an outer circumferential surface of the second corrugated tube 37, inserted into the second positioning hole 57a located on the opposite side, wound around the corresponding electrical wire tie contact portion 45 (see FIGS. 1A and 1B), and inserted into a buckle 69 of the electrical wire tie 47. Thus, the second corrugated tube 37 is fixed to the corrugated tube fixing portion 29.

Figure 6A:
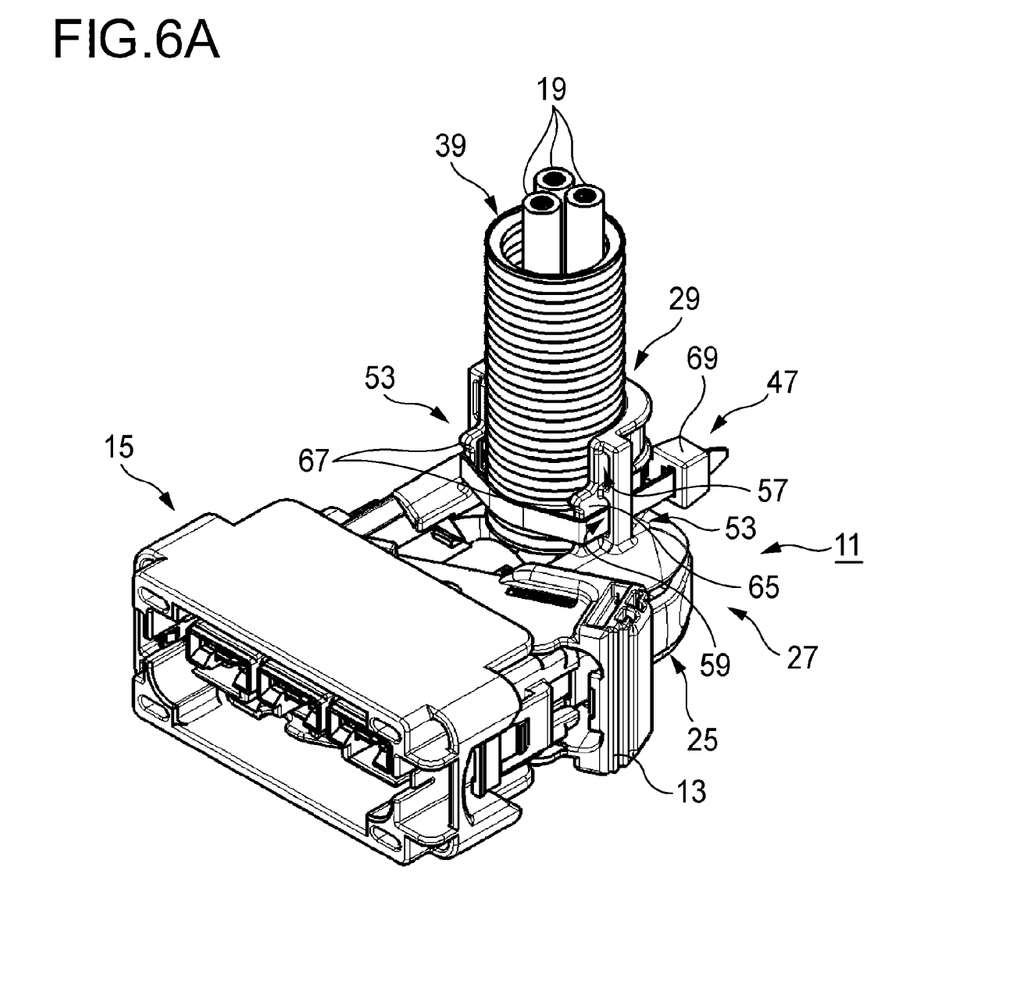
FIG. 6A is a perspective view of the electrical wire cover to which the third corrugated tube is attached.
Figure 6B:
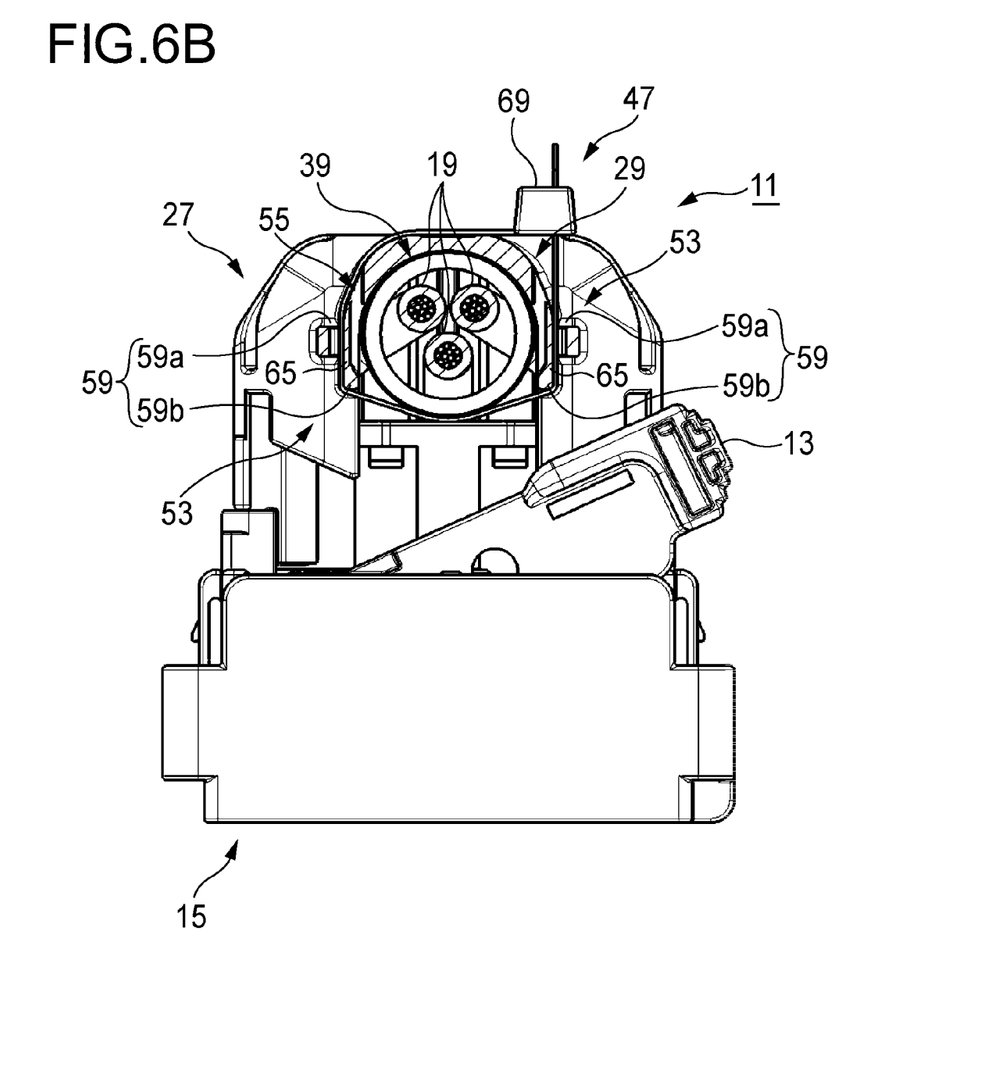
FIG. 6B is a front view, as viewed the electrical wire guide-out side, of the electrical wire cover shown in FIG. 6A.

To fix the third corrugated tube 39 to the electrical wire cover 11, as shown in FIGS. 6A and 6B, an end portion of the third corrugated tube 39 is placed in the corrugated tube fixing portion 29 in such a manner as to be engaged with the engagement projection strips 49 (see FIGS. 1A and 1B). The third corrugated tube 39 is fixed, that is, tightly fastened, to the corrugated tube fixing portion 29 by a electrical wire tie 47 that is inserted through the third positioning hole portions 59 of the tying member restricting portions 53. More specifically, a band tip portion of a electrical wire tie 47 is inserted into the third positioning hole 59a of one third positioning hole portion 59, wound on the associated elongated bridging wall 65, wound around an outer circumferential surface of the third corrugated tube 39, wound on the other elongated bridging wall 65, inserted into the third positioning hole 59a located on the opposite side, wound around the corresponding electrical wire tie contact portion 45 (see FIGS. 1A and 1B), and inserted into a buckle 69 of the electrical wire tie 47. Thus, the third corrugated tube 39 is fixed to the corrugated tube fixing portion 29.

As described above, in the electrical wire cover 11 according to the embodiment, one of the first to third corrugated tubes 35, 37, and 39 whose end portion is placed in the corrugated tube fixing portion 29 is fixed to the corrugated tube fixing portion 29 by an electrical wire tie 47. At this time, the position of the electrical wire tie 47 is determined by the tying member restricting portions 53 which are formed in the respective end portions 51 of the corrugated tube fixing portion 29 in an outer circumferential direction of the corrugated tube fixing portion.

Each tying member restricting portion 53 is provided with the first to third positioning hole portions 55, 57, and 59 having the different electrical wire tie 47 bridging positions that correspond to the outer diameters D1, D2, and D3 of the first to third corrugated tubes 35, 37, and 39, respectively. That is, whichever of the first to third corrugated tubes 35, 37, and 39 having the respective outer diameters D1, D2, and D3 is to be fixed, a electrical wire tie 47 is inserted through the one, having the corresponding electrical wire tie 47 bridging position, of the first to third positioning hole portions 55, 57, and 59 and is thereby prevented reliably from coming off. As such, since each tying member restricting portion 53 is provided with the first to third positioning hole portions 55, 57, and 59 having the different electrical wire tie 47 bridging positions, the corrugated tube fixing portion 29 can satisfactorily fix, that is, tightly fasten, the first to third corrugated tubes 35, 37, and 39 having the three respective outer diameters D1, D2, and D3 without causing events that electrical wire ties 47 crush them.

Furthermore, in each tying member restricting portion 53, the third positioning hole portion 59 which corresponds to the third corrugated tube 39 is provided outside the first positioning hole portion 55 which corresponds to the first corrugated tube 55. As a result, the total length of the tying member restricting portions 53 in the corrugated tube axial direction can be made smaller than in a case that positioning hole portions are arranged in the direction that is parallel with the axial direction, whereby size increase of the electrical wire cover 11 can be suppressed.

In each third positioning hole portion 59, the tip 59b of the elongated bridging wall 65 defines the electrical wire tie 47 bridging position. A electrical wire tie 47 that is inserted in the third positioning holes 59a of the third positioning hole portions 59 is stretched between the tips 59b of the elongated bridging walls 65 located on the two respective sides and fixes, that is, tightly fastens, the third corrugated tube 39 by pressing its top portion that projects relative to the semicylindrical corrugated tube fixing portion 29. In this state, in each third positioning hole portion 59, the electrical wire tie 47 bridging position is located outside the third positioning hole 59a in the tangential direction by the elongation length of the elongated bridging wall 65. The third corrugated tube 39 to be fixed, that is, to be fastened tightly, can be prevented from being crushed irrespective of the positions of the third positioning holes 59a. That is, in each third positioning hole portion 59, although the third positioning hole 59a is located at the same position as the second positioning hole 57a of the corresponding second positioning hole portion 57, the electrical wire tie 47 bridging position of the third positioning hole portion 59 is located outside that of the corresponding second positioning hole portion 57 in the tangential direction by the elongation length of the elongated bridging wall 65. As a result, the fixed, that is, tightly fastened, third corrugated tube 39 is not crushed.

Still further, a electrical wire tie 47 that is inserted in and guided out of the third positioning holes 59a of the third positioning hole portions 59 is hooked on the tips 59b (see FIGS. 1A and 1B) of the elongated bridging walls 65 and thereby fixes, that is, tightly fastens, the third corrugated tube 39. When the third corrugated tube 39 receives force of moving it in its axial line due to vibration or the like, the electrical wire tie 47 is urged to move in the same direction. However, the respective positioning projections 67 which project from the tips 59b of the elongated bridging walls 65 restrict the movement of the electrical wire tie 47. Thus, the electrical wire tie 47 is prevented reliably from coming off passing the tips 59b of the elongated bridging walls 65.

As such, the electrical wire cover 11 according to the embodiment enables use of the first to third corrugated tubes 35, 37, and 39 having the three respective outer diameters D1, D2, and D3 and prevents an electrical wire tie 47 from being disengaged from the tying member restricting portions 53.

Features of the above-described electrical wire protection member according to the embodiment of the invention will be summarized below concisely:

[1] A electrical wire protection member (electrical wire cover) 11 comprising a body (cover body) 27 which surrounds electrical wires 19 to be installed; a semicylindrical corrugated tube fixing portion 29 which is an integral part of the body (cover body) 27 and to which an end portion of one of plural kinds of corrugated tubes (first to third corrugated tubes) 35, 37, and 39 having different diameters is fixed, wherein the electrical wires 19 are inserted in the corrugated tube; engagement projection strips 49 which project inward from the corrugated tube fixing portion 29 so as to extend in a radial direction of the corrugated tube fixing portion, and which engage with respective outer circumferential grooves 33 of the one of the corrugated tubes (first to third corrugated tubes) 35, 37, and 39; a tying member (electrical wire tie) 47 which fixes, by tight fastening, the one of the corrugated tubes (first to third corrugated tubes) 35, 37, and 39 to an inner peripheral surface of the corrugated tube fixing portion 29; and tying member restricting portions 53 which are formed in respective end portions 51 of the corrugated tube fixing portion 29 in an outer circumferential direction of the corrugated tube fixing portion and which determine a position of the tying member (electrical wire tie) 47, wherein each of the tying member restricting portions 53 has plural positioning hole portions (first to third positioning hole portions) 55a, 57a, and 59a having different tying member (electrical wire tie) 47 bridging positions that correspond to the different diameters of the corrugated tubes (first to third corrugated tubes) 35, 37, and 39, respectively.

[2] The electrical wire protection member (electrical wire cover) 11 according to the configuration of item [1], wherein the positioning hole portions (third positioning hole portions) 59 corresponding to a corrugated tube (third corrugated tube) 39 having a maximum diameter are located outside respective positioning hole portions (first positioning hole portions) 55 corresponding to a corrugated tube (first corrugated tube) 35 having another diameter, and have respective elongated bridging walls 65 which extend in a tangential direction of the corrugated tube (third corrugated tube) 39.

[3] The electrical wire protection member (electrical wire cover) 11 according to the configuration of item [2], wherein positioning projections 67 which position the tying member (electrical wire tie) 47 project from tips 59b of the elongated bridging walls 65, respectively.

The electrical wire protection member according to invention is not limited the one according to the above embodiment, and various modifications, improvements, etc. can be made as appropriate. And the material, shape, dimensions, number (where plural ones are provided), location, etc. of each constituent element of the above embodiment are optional and no limitations are imposed on them as long as the invention can be implemented.

For example, although the above embodiment is directed to the electrical wire cover 11 as an example electrical wire protection member, it goes without saying that the invention can also be applied to various electrical wire protection members such as harness protectors and electric connection boxes having a corrugated tube fixing portion.

The present application is based on Japanese Patent Application No. 2012-165183 filed on Jul. 25, 2012, the disclosure of which is incorporated herein by reference.

INDUSTRIAL APPLICABILITY

The electrical wire protection member according to the invention enables use of plural kinds of corrugated tubes having different outer diameters and prevents a tying member from being disengaged from a tying member restricting portion(s).

DESCRIPTION OF SYMBOLS

11 . . . Electrical wire cover (electrical wire protection member)
19 . . . Electrical wire
27 . . . Cover body (body)
29 . . . Corrugated tube fixing portion
33 . . . Outer circumferential groove
35 . . . First corrugated tube (corrugated tube having another diameter)
37 . . . Second corrugated tube
39 . . . Third corrugated tube (corrugated tube having maximum diameter)
47 . . . Electrical wire tie (tying member)
49 . . . Engagement projection strip
51 . . . Two outer circumferential end portions
53 . . . Tying member restricting portion
55 . . . First positioning hole portion (positioning hole portion)
55a . . . First positioning hole
55b . . . Inside opening edge (bridging position)
57 . . . Second positioning hole portion (positioning hole portion)
57a . . . Second positioning hole
57b . . . Inside opening edge (bridging position)
59 . . . Third positioning hole portion (positioning hole portion)
59a . . . Third positioning hole
59b . . . Tip (bridging position)
65 . . . Elongated bridging wall
67 . . . Positioning projection

The invention claimed is:
1. An electrical wire protection member, comprising:
a body which surrounds an electrical wire to be installed;
a semi-cylindrical fixing portion which is an integral part of the body and to which an end portion of one of plural kinds of corrugated tubes having different diameters is fixed, wherein the electrical wire is inserted in the one of plural kinds of corrugated tubes;
engagement projection strips which project inward from the fixing portion so as to extend in a radial direction of the fixing portion, and which engage with respective outer circumferential grooves of the one of plural kinds of corrugated tubes;

a tying member which fixes, by tight fastening, the one of plural kinds of corrugated tubes to an inner peripheral surface of the fixing portion; and tying member restricting portions which are formed in respective end portions of the fixing portion in an outer circumferential direction of the fixing portion and which determine a position of the tying member, wherein each of the tying member restricting portions has plural positioning hole portions having different tying member bridging positions that correspond to the different diameters of the corrugated tubes, respectively.

2. The electrical wire protection member according to claim 1, wherein the positioning hole portions corresponding to a corrugated tube having a maximum diameter are located outside respective positioning hole portions corresponding to a corrugated tube having another diameter, and have respective elongated bridging walls which extend in a tangential direction of the corrugated tube.

3. The electrical wire protection member according to claim 2, wherein positioning projections which position the tying member project from tips of the elongated bridging walls, respectively.

4. The electrical wire protection member according to claim 1, wherein each of the tying member restricting portions has a first positioning hole portion and a third positioning hole portion, and the third positioning hole portion is located outside of the first positioning hole portion.

5. The electrical wire protection member according to claim 4, wherein each of the tying member restricting portions has a second positioning hole portion, and the third positioning hole portion is located outside of the second positioning hole portion.

6. The electrical wire protection member according to claim 1, wherein each of the tying member restriction portions includes a projected portion which projects outward in the radial direction from each of the tying member restricting portions, and each projected portion includes at least one of the plural positioning hole portions.

* * * * *